(No Model.)
W. G. THORPE.
HITCHING DEVICE.
No. 375,227. Patented Dec. 20, 1887.
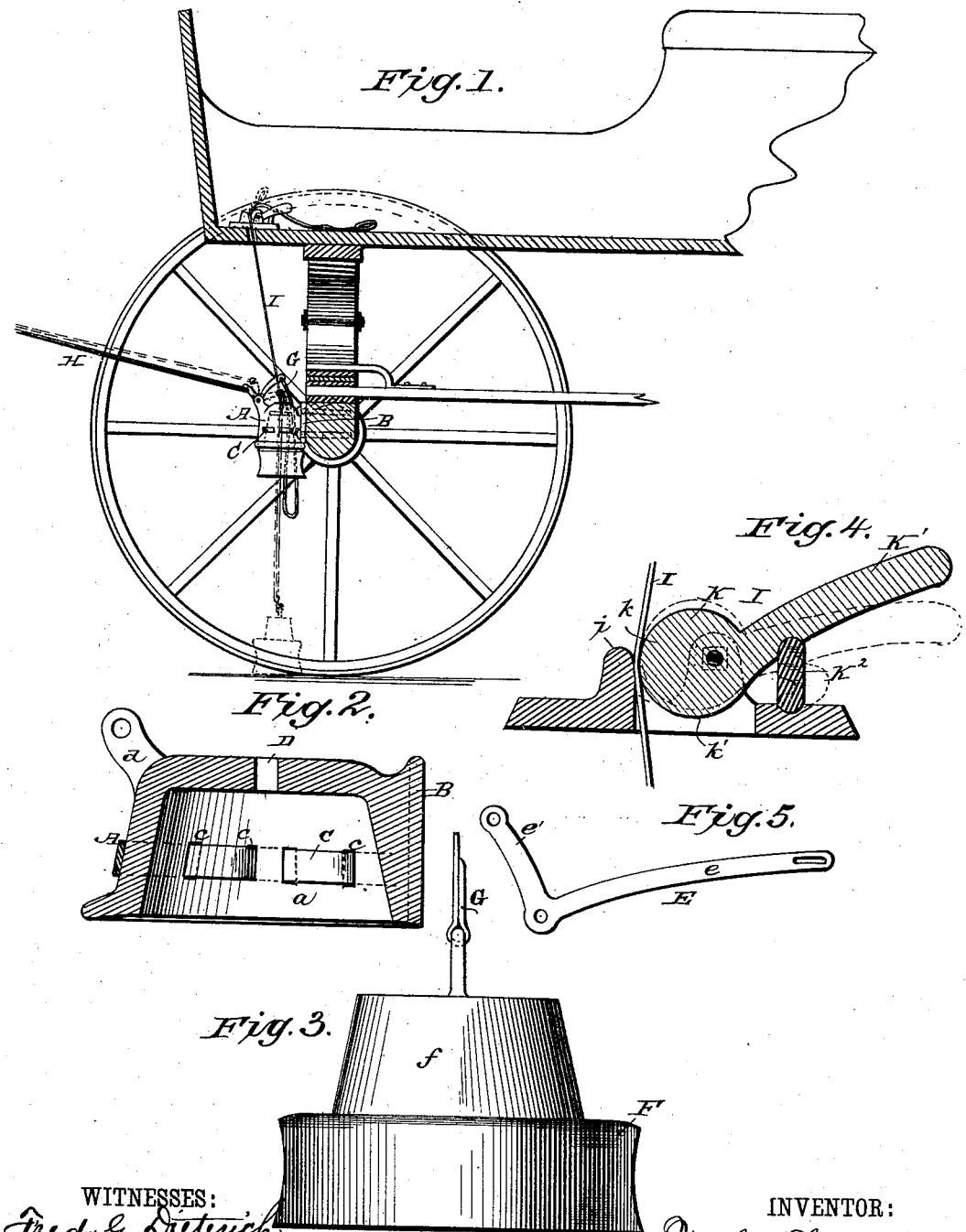
WITNESSES:
Fred G. Dieterich
P. B. Turpin
INVENTOR:
W. G. Thorpe
BY Munn & Co
ATTORNEYS.

UNITED STATES PATENT OFFICE.

WILLARD GARDNER THORPE, OF ST. PAUL, MINNESOTA.

HITCHING DEVICE.

SPECIFICATION forming part of Letters Patent No. 375,227, dated December 20, 1887.

Application filed September 28, 1887. Serial No. 250,958. (No model.)

*To all whom it may concern:*

Be it known that I, WILLARD GARDNER THORPE, of St. Paul, in the county of Ramsey and State of Minnesota, have invented a new and useful Improvement in Hitching Devices, of which the following is a specification.

My invention is an improvement in hitching devices, and seeks to provide a simple construction, under the control of the occupant of the vehicle, by which the horse may be hitched and prevented from moving forward or back, and which devices may be brought into play, in case of a runaway, to check the horse. The hitching devices may also be brought into position to release the horse when the driver is in the vehicle, so that the horse cannot start up when the driver is getting into the vehicle, but will be firmly held until it is desired to start.

The invention consists, broadly, in the combination, with the vehicle, of a weight having a connection for securing it to the horse, such connection being disposed over a guide on the vehicle, and a detent whereby the force of such weight may be held clear of or be freed to secure the horse, as may be desired.

The invention consists, further, in certain features of construction and novel combinations of parts, as will be hereinafter described and claimed.

In the drawings, Figure 1 is a vertical section of a part of a carriage provided with my improvements, the weight being shown elevated in full lines and indicated as lowered in dotted lines. Fig. 2 shows the socketed receiver in detail. Fig. 3 shows the weight in detail. Fig. 4 is a detail view of the detent, the motion thereof being indicated in dotted lines; and Fig. 5 is a detail view of the lever.

In carrying out my invention I provide the receiver A, of cast or forged iron and adapted for connection with the vehicle, preferably by having a plate, B, which may be secured by bolt and clips, as shown, or in other suitable manner, it may be, to the axle, as shown, to the perch-pole, or to any other suitable part of the vehicle. This receiver has a socket, $a$, in its under side, and is provided, through one or more of the walls of said socket, with slots C, through which a strap, $c$, is disposed, for the purpose of forming a cushion between the wall of the socket and the portion of the weight fitted therein, the ends of the strap being secured by riveting or in other suitable manner. This cushioning prevents any rattling of the parts, as will be readily understood.

An opening, D, is formed through the top wall of the socket $a$, and on the top of the receiver I provide ears $d$, to facilitate the pivoting of the lever E to the receiver. This lever E has a long arm, $e$, and a short arm, $e'$; and while it is preferred to pivot the lever to the receiver it might be otherwise pivoted in proper relation to said receiver without departing from some of the broad features of my invention.

The weight F has a portion, $f$, fitted to the socket $a$ of the receiver A and movable into and out of the same in the operation of the invention. This weight is joined by a connection, G, with the long arm of the lever E, and may be raised and lowered by the rocking of such lever. While said connection G, as well as the other connections presently described, are shown as straps, and while they are termed "straps" and designated in the appended claims as straps, it will be understood that I do not desire to be limited to straps, as cords or ropes may be substituted therefor when so desired.

The short arm $e'$ of the lever E is connected with the bridle or bit by a strap, H. The connections H and G are of such length that when the weight is lowered it will rest on the ground, the strap being comparatively taut, so that it will not pull on the horse's mouth, but so as to keep the strap without too much play. A lifting-strap, I, is connected with the weight and extends upward through the detent J, being usually sufficiently long to reach to the top of the dash-board.

The detent I comprises a bearing, $i$, against which the strap is clamped. Adjacent to this bearing $i$, I pivot the cam K, having a portion, $k$, by which the strap may be clamped against the bearing $i$, and a portion, $k'$, which, when brought opposite bearing $i$, will permit the lifting-strap to slip freely through. The cam K has a handle, K', by which it may be turned, and it may be conveniently operated by the foot, a rubber or other spring $K^2$ being placed under the handle to hold the cam normally in position to clamp the strap against the bearing.

In operation, by bearing upon the handle of the detent the weight will be released, drop to the ground, and the horse will be hitched. While the weight might be connected directly to the strap extending to the bit, it is preferred to form such connection through the aid of the pivoted lever, for the reason that such lever multiplies the power of the weight and renders practicable the use of a much lighter weight than would otherwise serve the desired purpose. When the horse is stopped, it is only necessary to trip the detent, when the weight will fall. Should the horse start off, the weight will drag and the influence thereof will be increased by reason of the lever. Then should he back, the weight will again operate to check him, so the device will operate to check both forward and backward movement. If the horse should run away, it is only necessary to trip the detent and lower the weight, when he will gradually be brought to a standstill. On entering the vehicle the weight may be raised and secured elevated by the detent.

It will be seen that the horse cannot start off while the driver is entering the vehicle, nor until the detent is released. The device also permits the driver to stop at any point along a carriage way or road, it not being necessary to find a post, tree, or other object to which to hitch.

It is manifest that different forms of detent mechanism may be employed without departing from the broad principle of my invention; but I prefer that shown, because it is simple, inexpensive, and not liable to get out of order.

While the invention is shown in connection with a wheeled vehicle, it is manifest it may be used with sleighs and other vehicles.

Having thus described my invention, what I claim as new is—

1. The combination, with the vehicle, of the hitching-weight, a connection for securing such weight to the horse, and a detent whereby such weight may be supported from the vehicle and free of the horse, or may be released, substantially as and for the purposes specified.

2. The combination, with a vehicle, of a bell-crank lever pivoted in connection therewith, a weight suspended from the long arm of the lever, a strap for connecting the short arm of the lever with the horse, and a detent whereby the weight may be supported free of the horse, or may be released in the operation of the device, substantially as set forth.

3. A hitching device for horses comprising a receiver adapted for connection with the vehicle and having a socket in its under side, substantially as described, and the weight having a portion movable into and out of such socket, substantially as set forth.

4. In a hitching device, a receiver having a socket in its under side, combined with the weight having a portion fitted to and movable into and out of the socket, and a cushion interposed between said portion of the weight and the wall of the socket, substantially as set forth.

5. A hitching device comprising a receiver having a socket in its under side and provided with slots leading through a wall or walls thereof, whereby to facilitate the application of a cushioning-strap, and the weight having a portion fitted to said socket, substantially as set forth.

6. In a hitching device, the combination of a receiver adapted for connection with the vehicle and having a socket in its under side, the weight having a portion fitted to the socket of the receiver, and the bell-crank lever pivoted to said receiver, substantially as and for the purposes specified.

7. The combination of the vehicle, the receiver secured to the said vehicle below the body-bed, the weight movable toward and from such receiver, the pivoted lever having one arm connected with the weight, the detent supported on the body-bed, and the strap extended from the pivoted lever into position for engagement by said detent, substantially as set forth.

8. In a hitching device, the combination of the vehicle, the detent consisting of a bearing, the clamping-cam pivoted adjacent to said bearing and adapted to clamp a strap thereagainst, and having a handle-arm whereby it may be operated, a weight suspended below the detent, a strap for connecting such weight with the horse, and a strap connected with such weight and extended upward between the clamping-cam and the bearing therefor, substantially as set forth.

WILLARD GARDNER THORPE.

Witnesses:
J. H. HARRIS,
WM. C. HARRIS.